United States Patent [19]

Holly

[11] 3,939,531

[45] Feb. 24, 1976

[54] MOLDING DEVICE

[75] Inventor: James A. Holly, Richton Park, Ill.

[73] Assignee: Hollymatic Corporation, Park Forest, Ill.

[22] Filed: May 9, 1973

[21] Appl. No.: 359,199

[52] U.S. Cl. .................................................. 17/32
[51] Int. Cl.² ........................................... A22C 7/00
[58] Field of Search ............... 17/32; 425/233, 425; 100/DIG. 10, 226

[56] References Cited
UNITED STATES PATENTS

| | | | |
|---|---|---|---|
| 1,757,447 | 5/1930 | Comstock | 17/32 |
| 2,702,405 | 2/1955 | Garfunkel | 17/32 |
| 3,008,235 | 11/1961 | Royer et al. | 17/32 X |
| 3,203,037 | 8/1965 | Anhanger et al. | 17/32 |
| 3,347,176 | 10/1967 | Hall | 17/32 |
| 3,415,206 | 12/1968 | Reisman | 17/32 |
| 3,417,425 | 12/1968 | Holly | 17/32 |
| 3,491,401 | 1/1970 | Holly | 17/32 |

Primary Examiner—Louis G. Mancene
Assistant Examiner—James D. Hamilton
Attorney, Agent, or Firm—Hofgren, Wegner, Allen, Stellman & McCord

[57] ABSTRACT

Apparatus for molding articles such as patties from plastic food material that tends to shrink during processing cooking and the like, for example ground beef, in which the material is forced under pressure in a stream from a supply into a mold cavity through a passage having opposite side walls at a specific relationship to the stream and to each other and a specific width at the cavity so as to cause mixing, tumbling and kneading of the material in its flow through the passage with the result that the shaped portion when cooked or similarly processed essentially maintains its shape. Thus, if the shaped portion is, for example, a circular patty such as a hamburger patty it substantially maintains its circular shape throughout the processing.

7 Claims, 2 Drawing Figures

MOLDING DEVICE

BACKGROUND OF THE INVENTION

Applicant's prior U.S. Pat. No. 3,417,425 discloses a molding apparatus in which a movable feeder is movable in a hopper toward and away from an exit to force plastic material through the exit into an article shaping mold adapted to communicate with the exit. Prior U.S. Pat. No. 3,486,186 discloses a molding apparatus having a narrow fill slot at the mold cavity. These and this application are assigned to the same assignee.

One of the features of this invention is to provide a molding apparatus in which plastic food material is forced from a supply under pressure through a passage into a shaping cavity and the walls of the passage are so arranged and sloped and spaced as to produce a combined mixing, tumbling and kneading of the material whereby fibers in the material are randomly intermixed so that during cooking and similar processing the shaped portion shrinks substantially uniformly in all directions and round patties, for example, substantially maintain their circular shape.

DESCRIPTION OF THE PREFERRED EMBODIMENT

Figure 1:
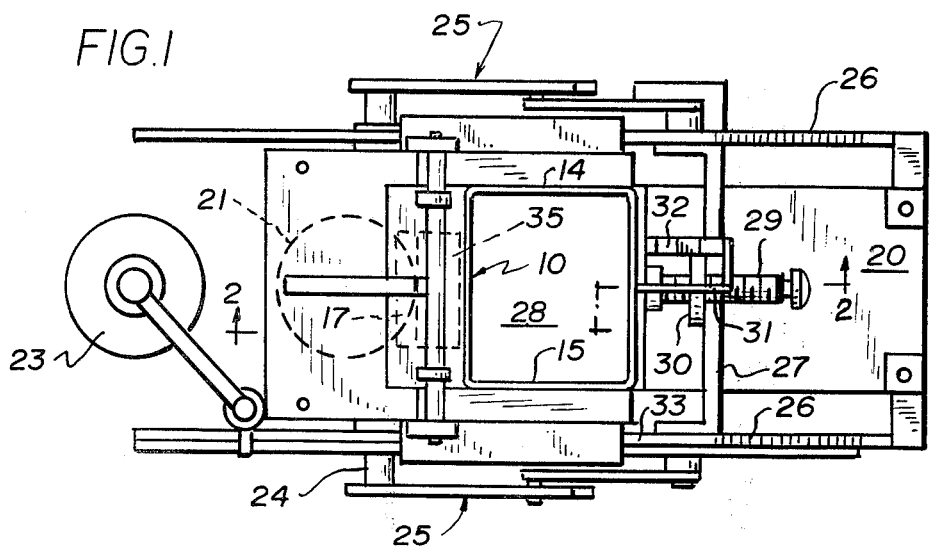
FIG. 1 is a plan view of an apparatus embodying the invention.

The molding apparatus illustrated in the accompanying drawings is for molding patties of plastic food material such as ground meat. The illustrated molding apparatus itself is that disclosed and claimed in the above prior U.S. Pat. No. 3,417,425 with the addition of the structure of this invention. For that reason only enough of the structure of the molding apparatus itself is shown to illustrate the present invention.

The molding apparatus shown in the accompanying drawings comprises a hopper 10 adapted to retain a supply 11 of plastic material such as food material of which ground beef is a good example. This hopper 10 is provided with front 12, rear 13 and opposite side walls 14 and 15 having inner surfaces that are in contact with the contained plastic material 11.

Figure 2:
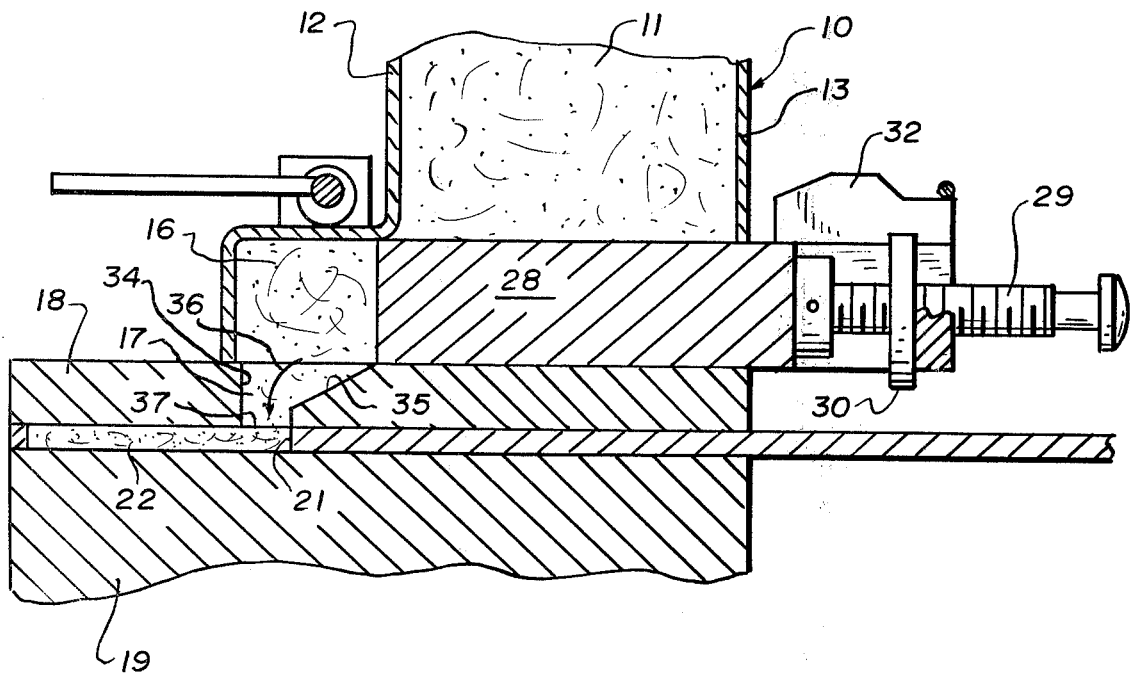
FIG. 2 is an enlarged fragmentary vertical sectional view through the longitudinal center of the apparatus.

At the bottom of the front wall 12 there is provided a forwardly extending front cavity or compression chamber 16 beneath which is located a supply passage 17 terminating in an end opening 37 through a top retaining plate 18 between which and a bottom retaining plate 19 a mold plate 20 is reciprocated. As shown in FIG. 2 when the mold plate 20 is in retracted position a shaping cavity or mold opening 21 is in position to receive plastic material forced from chamber 16 and through the exit 17 to form a plastic material patty 22. The end or terminal portal 37 is at this cavity 21 during filling thereof.

As is explained in detail in the above first patent, incorporated here by reference, the mold plate 20 is reciprocated between the position of FIGS. 1 and 2 where the opening 21 is in position beneath the hopper 10 to receive plastic material therefrom and an extended position (not shown) where the mold opening or shaping cavity 21 is beneath a knockout ring or inverted cup 23 which is lowered in timed sequence into the extended opening 21 to dislodge the formed patty 22 therefrom. Because the apparatus for moving the mold plate 20 and the knockout ring 23 and the operating means therefor form no part of the present invention they are not illustrated here in detail but reference may be had to the above first prior patent.

As is explained in the above first patent the reciprocating of the mold plate 20 between its above-described extreme positions is achieved through motor driven drive means including a motor shaft 24, a pair of hinged linkage systems 25 and a first pair of side racks 26 and a second pair of side racks 33 thereabove. Interconnecting these parallel side racks 33 at the rear is a cross bar, also as explained in the above patent, which is adapted to reciprocate a reciprocable feeder ram 28 by means of an adjustable bolt 29 and nut 30 arrangement that is periodically latched in forward position by a latch 31 that is arranged to be released in proper timed sequence by a release cam 32 mounted on the cross bar 27 for movement therewith.

With this structure the apparatus provides a system in which as the mold plate 20 is reciprocated from its rearmost position as shown in FIGS. 1 and 2 to a forward position where the mold opening 21 is beneath the knockout ring 23 the feeder 28 is reciprocated from its forwardmost position of FIGS. 1 and 2 to a rear position. This provides periodic filling of the mold opening 21 to form a flat circular patty and removal of the patty from the mold opening by the ring 23.

In order to mix and knead the material such as the illustrated ground meat during its passage into the opening or shaping cavity 21 the spaced wall means 34 and 35 forming the exit or supply passage 17 are angled with relation to each other in a manner to cause tumbling, mixing and kneading of the plastic material in the supply 16 into the opening or shaping cavity 21 to form a flat circular patty 22.

Thus as illustrated in FIG. 2 the first side 34 of the wall means is substantially parallel to the general direction of the stream flow 36 of the meat at the end 37 where the stream passes through to enter the cavity 21. The opposite or second side 35 of the passage 17 wall means is angled toward the cavity 21 and the one side 34 such that the included converging angle of the sides 34 and 35 is about 50°–65° or in the illustrated embodiment about 25°–50° to the mold plate 20. In the preferred embodiment this angle is about 58-60°.

In forcing the material 11 through the opening 17 into the cavity 21 the pressure is applied by the reciprocable ram 28 which reciprocates in a horizontal path toward and away from the supply passage 17 in the manner described. This path as shown is at substantially right angles to the one side 34 of the passage wall and during the extreme forward movement of the ram 28 it extends into the compression chamber 16 thereby applying pressure to the plastic material therein and forcing it through the supply passage 17 into the mold cavity 21.

As can be seen from the above description the invention is particularly applicable to fiber containing plastic material such as food material and especially ground meat, fish and the like. Tumbling, kneading and mixing is so complete in the flow into and through the passage 17 that the fibers are thoroughly intermixed so that during subsequent cooking or similar processing the shaped portion maintains substantially its original molded shape.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Apparatus for molding a shaped portion of a plastic food material that tends to shrink during cooking and the like, comprising: supply means for providing a supply of said plastic material; a mold having a shaping cavity with a peripheral edge for forming said shaped portion; spaced wall means forming a supply passage from said supply means to said cavity; and pressure means at one side of said supply passage for applying pressure to said plastic material supply and thereby forcing said material in a stream through said passage and into said cavity at said cavity edge for filling the cavity, said wall means supply passage externally of and adjacent to said shaping cavity having a first side opposite to said pressure means generally parallel to the general direction of said stream entering said cavity and a second side adjacent to said pressure means angled toward said cavity and said one side, said first and second sides forming a converging included angle of about 50°–65° and said wall means supply passage having a width at said cavity of about 5/16–7/16 inch, said first and second wall sides and said supply passage width in combination with said pressure means comprising means for tumbling and kneading said food material during its flow into said cavity.

2. The apparatus of claim 1 wherein said cavity has the shape of a flat patty and said one side of the passage is at generally right angles thereto.

3. The apparatus of claim 1 wherein said angle is about 58°–60°.

4. The apparatus of claim 1 wherein said width is about ⅜ inch.

5. The apparatus of claim 1 wherein said pressure means comprises a ram member and means for reciprocating said ram toward and away from said passage and the cavity in communication therewith.

6. The apparatus of claim 5 wherein said reciprocation is in a generally horizontal path that is at substantially right angles to said one side of the passage.

7. The apparatus of claim 5 wherein there are provided compression chamber means as a part of said supply means and into which said ram projects during the forcing of said material through said passage into the cavity.

* * * * *